Patented June 14, 1938

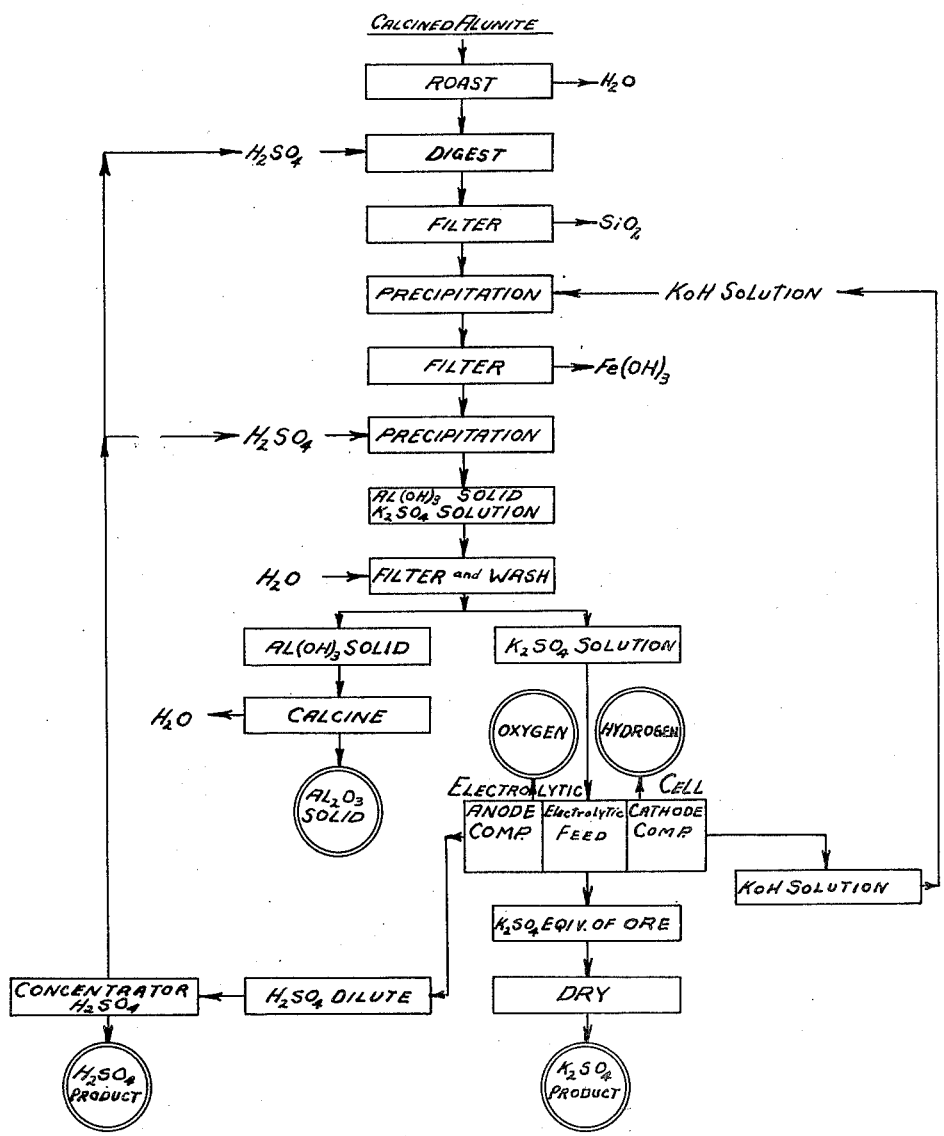

2,120,840

UNITED STATES PATENT OFFICE 2,120,840

CYCLIC PROCESS FOR TREATING ALUNITE

William E. McCullough, Detroit, Mich., assignor to Bohn Aluminum & Brass Corporation, Detroit, Mich., a corporation of Michigan Application August 20, 1934, Serial No. 740,710
Renewed October 27, 1937

4 Claims. (Cl. 23—31)

The invention relates to the treatment of aluminum ores, and more particularly to that class known as alunite ores, for the extraction therefrom of aluminum oxide and other by-products.

It is the object of the invention to obtain a cyclic process which in the case of alunite ores requires no reagents other than those contained in and obtained from the ore. This has the advantage that the process may be carried out in the vicinity of the ore deposits which are frequently at remote and inaccessible points. The process, however, is also applicable to other aluminum ores, such as bauxite, but with such modification the reagents used are not originally obtained from the ore but are re-used in a cyclic process. The invention therefore consists in the novel process as hereinafter set forth.

The drawing represents a diagram of the complete cyclic process.

Alunite ores contain alunite $$K_2O.3Al_2O_3.4SO_3.6H_2O$$

and various other materials such as silica, ferrous oxide and other impurities. It is the primary object of the treatment to separate the potassium and the aluminum compounds and to remove the impurities therefrom. It is a further object to derive the reagents used in the treatment such as sulphuric acid $H_2SO_4$ and potassium hydroxide KOH from the ore and to re-use the same continuously in the cyclic process. Still further it is an object to place the excess of these reagents over that required for the extraction of the alumina in a form which has comercial value.

Electric current may be used both in the heat treatment and electrolytic decomposition of the ore. As illustrated in the diagram, the successive steps in the process are as follows: The crude ore is first subjected to a roasting or heat treatment to calcine the same, driving off the greater part of the water content according to the following reaction: $K_2SO_4,Al_2(SO_4)_3 2Al_2O_3.6H_2O$ calcined = $K_2SO_4+Al_2(SO_4)_3+2Al_2O_3$. The calcined material is then treated in a digester with sulphuric acid $H_2SO_4$ which converts all of the aluminum oxide $Al_2O_3$ into aluminum sulphate $Al_2(SO_4)_3$. Also if there are iron and other metallic salts present as impurities, these will be converted into soluble sulphates. During this treatment there is a sufficient excess of sulphuric acid to insure a fairly complete conversion of the aluminum, potassium and other metallic compounds into sulphates. The next step in the process is to filter the solution to remove therefrom the insoluble materials such as silica $SiO_2$. The filtrate containing all of the soluble salts is then treated with potassium hydroxide to produce the following reactions:

(a) $H_2SO_4+2KOH=K_2SO_4+H_2O$.
(b) $Al_2(SO_4)_3+8KOH=$
$2KAlO_2+3K_2SO_4+4H_2O$.
(c) $FeSO_4+2KOH=Fe(OH)_2+K_2SO_4$.

If in the above reaction the quantity of potassium hydroxide were limited, the aluminum would also be precipitated in the form of aluminum hydroxide $Al(OH)_3$, but with an excess of the potassium hydroxide this becomes $KAlO_2$, which is a soluble salt. Thus the insoluble $Fe(OH)_2$ may be removed by filtration, which is the next step in the process. The filtrate is then treated with sulphuric acid to neutralize the potassium hydroxide, limiting the quantity so as to only precipitate the $Al(OH)_3$ without converting the same into $Al_2(SO_4)_3$, the reaction being as follows:

$$2KAlO_2+H_2SO_4+2H_2O=K_2SO_4+2Al(OH)_3.$$

The $Al(OH)_3$ is removed by filtration and is thoroughly washed with water. The filter cake is then calcined to convert the same into aluminum oxide $Al_2O_3$. The filtrate contains only potassium sulphate which is next electrolyzed, preferably in an electrolytic cell of the diaphragm type to partially separate the same into sulphuric acid and potassium hydroxide. It is not, however, necessary that this reaction should be complete, as the mixture of potassium sulphate with the electrolyzed products will not interfere with the use of the latter in the cyclic process. The liquid products of electrolysis are then returned for re-use and the gaseous products, oxygen and hydrogen, may be separately collected. If the sulphuric acid is too dilute, it may be concentrated before returning.

Inasmuch as the reagents used in the process $H_2SO_4$ and KOH are derived from the original ore and as they are re-combined in the process to form $K_2SO_4$, it is obvious that there will be an accumulation of the latter product. This has a high commercial value without conversion to sulphuric acid or potassium hydroxide and therefore the electrolytic decomposition is only carried to the extent which will furnish the necessary reagents for continuing the cyclic process. The final products of the process are aluminum oxide, potassium sulphate and sulphuric acid.

The process as above given is used for the treatment of ores containing more than 10% of silica. Where, however, ores have a smaller percentage of silica, the first three steps may be omitted and the uncalcined ore may be directly treated in a boiling 12% solution of potassium hydroxide. This will place the potassium and aluminum salts in solution, leaving the silica and iron compound insoluble, which may then be removed by filtration. The rest of the process will be the same as that previously described.

A modification of my process may be used in the treatment of aluminum ores other than alunite, for instance bauxite $Al_2O(OH)_4$ contains neither sulphates nor potassium salts and therefore the sulphuric acid and the alkali hydroxide must be obtained from other sources. Inasmuch, however, as the alkali sulphate is electrolyzed to form sulphuric acid and alkali hydroxide, the process is cyclic and it is only necessary to supply sufficient additional reagents to make up for unavoidable losses. In this modification I preferably use sodium hydroxide in place of the potassium hydroxide, this being a cheaper product, but otherwise the reactions are the same as previously described. Loss of chemicals in the process may be replenished by addition of salt cake ($Na_2SO_4$) to the electrolytic cell feed.

Certain alunite ores contain prosphorus. Where this exists in sufficient quantity to be detrimental, it may be removed, preferably by treating with calcium hydroxide simultaneously with the treatment by the alkali hydroxide, the reaction being as follows: $2K_3PO_4+3Ca(OH)_2= Ca_3(PO_4)_2+6KOH$. The $Ca_3(PO_4)_2$ tertiary calcium phosphate is nearly insoluble in water and therefore will be removed with the precipitates.

What I claim as my invention is:

1. The process for treating alunite ores to derive therefrom aluminum oxide, potassium sulphate and sulphuric acid, the steps of treating the alunite with potassium hydroxide to precipitate metallic hydroxides but with sufficient excess of the potassium hydroxide to avoid precipitation of aluminum hydroxide and to form potassium aluminate, separating the precipitates from the solution, treating the solution with sulphuric acid limited in quantity to precipitate aluminum hydroxide without the formation of aluminum sulphate, separating the solution from the precipitate, electrolytically decomposing a portion of the solution to obtain sulphuric acid and potassium hydroxide and returning the potassium hydroxide and a portion of the sulphuric acid for use in rendering the process cyclic, whereby the excess of potassium sulphate and sulphuric acid are by-products.

2. In a process for treating alunite ores to derive therefrom aluminum oxide, potassium sulphate and sulphuric acid, the steps of treating the calcined ore with sulphuric acid in sufficient quantity to form in solution potassium sulphate, aluminum sulphate, other metallic sulphates and free sulphuric acid, separating the solution from the solid constituents, treating the separated solution with potassium hydroxide in sufficient quantity to form of the aluminum sulphate potassium aluminate and to precipitate other metallic sulphates as insoluble hydroxides, separating the solution from the precipitate, treating the solution with sulphuric acid limited in quantity to precipitate aluminum hydroxide without the formation of aluminum sulphate, separating the solution from the precipitate, electrolytically decomposing a portion of the separated solution to obtain sufficient potassium hydroxide to render the process cyclic with a surplus of sulphuric acid and potassium sulphate and returning the potassium hydroxide and a portion of the sulphuric acid.

3. The process of treating alunite ores to derive therefrom aluminum oxide, potassium sulphate and sulphuric acid comprising roasting the ore to calcine the alunite, treating the calcined product with sulphuric acid in sufficient excess to convert all of the aluminum constituents into aluminum sulphate in solution, together with soluble potassium sulphate, other soluble metallic sulphates and free sulphuric acid, separating the solid constituents of the ore from the solution, treating the solution with potassium hydroxide in sufficient quantity to convert the potassium aluminum sulphate to potassium aluminate without the formation of aluminum hydroxide, and to precipitate other metallic hydroxides, separating the solution from the precipitate, treating the solution with sulphuric acid limited in quantity to precipitate aluminum hydroxide without converting the same into aluminum sulphate, separating the solution from the precipitate, electrolytically decomposing a portion of the separated solution to form sulphuric acid and potassium hydroxide, with sufficient quantity of the latter to render the process cyclic and with an excess of the sulphuric acid and potassium sulphate and returning the potassium hydroxide and a portion of the sulphuric acid.

4. In a process for treating alunite ores containing phosphorous to derive therefrom aluminum oxide and including treatment with alkali metal hydroxide to precipitate certain metallic hydroxides, said alkali metal hydroxides being in sufficient amount to maintain the aluminum in solution as alkali metal aluminate, the step of introducing calcium hydroxide with the alkali hydroxide in sufficient quantity to convert the phosphorous content to tertiary calcium phosphate and removing the latter with other precipitates.

WILLIAM E. McCULLOUGH.